United States Patent [19]

Mistral et al.

[11] Patent Number: 5,693,896
[45] Date of Patent: Dec. 2, 1997

[54] TEST RIG FOR ROTORS OF GYROCRAFT

[75] Inventors: Lucien Henri Baptiste Mistral, Chateauneuf-les-Martigues; Gérard Donat Chabassieu, Eguilles, both of France

[73] Assignee: Eurocopter France, Marignane Cedex, France

[21] Appl. No.: 613,998

[22] Filed: Mar. 11, 1996

[30] Foreign Application Priority Data

Mar. 16, 1995 [FR] France .................. 95 03074

[51] Int. Cl.⁶ ............................................ G01N 19/08
[52] U.S. Cl. .................. 73/865.9; 73/178 H; 73/865.6
[58] Field of Search ............... 73/865.6, 865.9, 73/860, 178 H, 862.045, 862.49; 416/61

[56] References Cited

U.S. PATENT DOCUMENTS

| | | | |
|---|---|---|---|
| 2,815,665 | 12/1957 | Brown | 73/865.9 |
| 4,970,651 | 11/1990 | Favre et al. | 73/178 H |
| 5,309,766 | 5/1994 | Touzeau et al. | 73/865.6 |

FOREIGN PATENT DOCUMENTS

| | | | |
|---|---|---|---|
| 04 047246 | 6/1990 | Japan . | |
| 47246 | 2/1992 | Japan | 73/178 H |
| 1 381 946 | 2/1972 | United Kingdom . | |
| 2116804 | 9/1993 | United Kingdom | 73/178 H |

*Primary Examiner*—Michael Brock
*Assistant Examiner*—Nashmiya Ashraf
*Attorney, Agent, or Firm*—Larson and Taylor

[57] ABSTRACT

The rig comprises a vertical electric motor in a shell-type framework carrying a force balance itself supporting either a main rotor in dynamic tests or a complete propulsion assembly with main rotor in endurance tests, or a height extender supporting, on the one hand, an upper shaft line being coupled to a lower shaft line supported in the framework and driven by the motor and, on the other hand, an inverse-thrust rotor mast, driving a hub jig linked to blades mounted inverted so as to exercise a thrust downwards. The mast is linked to the shaft line by a torque meter and is mounted rotating in a bearing supported by a second balance fixed to the height extender. The mast and the upper shaft line are removable with the height extender in order to make the rig multi-purpose and useable for performance, endurance and dynamic tests of helicopter rotors.

18 Claims, 9 Drawing Sheets

TEST RIG FOR ROTORS OF GYROCRAFT

FIELD OF THE INVENTION

The invention relates to a performance test rig, in particular for full scale performance out of ground effect, for gyrocraft rotors, in particular helicopter rotors, which is preferably also multi-purpose in that, subject to limited rearrangements, it allows both endurance tests on complete propulsion assemblies and their subassemblies, especially power trains, and performance tests on helicopter main rotors, in particular out of ground effect and to full scale, and tests on the dynamic behaviour of the lifting or main rotors as well as auxiliary or anti-torque rotors, transmissions, main or auxiliary gearboxes, power plants, suspensions and assemblies combining several of these components, possibly as well as operating tests on rotor equipment, such as alternators, actuators, particularly flight controls, rotor brakes, pumps, fans, etc.

For preference, the test rig is also multi-purpose in that, also subject to limited rearrangements, it makes it possible to carry out the abovementioned tests on rotors of different models of gyrocraft, belonging to different categories, for example light helicopters (with a mass of about 1.5 to 2 tonnes, with a main rotor with a diameter of the order of 10 m), medium-tonnage helicopters (mass of the order of 4 to 5 tonnes, and a main rotor with a diameter of about 12 to 13 m) and heavy helicopters (mass of the order of 8 to 10 tonnes, and diameter of the main rotor greater than 16 m for example).

BACKGROUND OF THE INVENTION

When it is multi-purpose, the test rig of the invention is particularly intended advantageously to replace the various endurance rigs used up to the present, each of which is specific to a particular model of helicopter, and which moreover do not allow performance measurements on full-scale main rotors. Moreover, these known endurance rigs have the additional drawback that their maintenance becomes difficult and of too high a cost when development trials on the models of helicopters which correspond to them are terminated.

Furthermore, it is known that the power consumed by a helicopter main rotor in hovering flight is a determining parameter for the dimensioning of the helicopter.

At the present time, and except for small rotors, only flight trials allow access to the power-lift curve in hovering flight out of ground effect, within the following notable limits, however: safety, accuracy of the measurements, difficulty of flight behavior out of ground effect (which poses the problem of the reproducibility of the measurements), and difficulty in evaluating the lift cancellation by the fuselage.

In addition to flight trials, it is necessary to take performance measurements on small-scale mock-ups using test rigs equipped with balances, but the size effect may be a penalty.

Helicopter rotor performance test and/or dynamic analysis towers exist, the height of these towers varying in the order of 5 to 20 m.

FR-A-2 174 072 describes such a rotor test tower which comprises a vertical support structure, an energy source at the foot of the tower which drives a substantially vertical driveshaft, carrying rotor hub and blades at its upper extremity, the tower including blade cyclic and collective pitch controls, as well as measurement apparatus continuously giving indications and measurements relating to many parameters, particularly the forces and moments being exerted on the blades, the hub, the rotor shaft as well as on the pitch controls throughout the collective and cyclic pitch ranges. However, towers of limited height (between 5 and 10 m) allow only performance tests in ground effect, even for small-diameter rotors, whereas very high towers (about 20 m) do not allow performance tests out of ground effect on rotors with a diameter greater than about 10 m.

Endurance rigs are also known, configured to carry out part of the dynamic analyses and measurements of performance necessary, but which do not remedy the abovementioned drawbacks.

Finally, balancing rigs are known, equipped with a motor driving a hub in rotation, which is not representative of a helicopter hub, and to which three blades, for example, are fixed, simultaneous balancing of which is carried out.

SUMMARY OF THE INVENTION

A first object of the invention is to propose a test rig allowing the measurement of performance of the blades of a main rotor in hovering flight out of ground effect, while being of a height very much less than the minimum theoretical height, equal to twice the diameter of the rotor on test, acknowledged for performance test towers.

Another object of the invention is to propose a multi-purpose test rig remedying the drawbacks of known endurance rigs and test towers, and making it possible to carry out the various abovementioned tests, and in particular tests of dynamic behavior, endurance and performance of the rotors to full scale, for helicopters of different categories.

Yet another object of the invention is to propose a test rig combining the test facilities necessary for data acquisition on the ground on the operation of the main rotors in hovering flight, and allowing performance measurements as well as dynamic analysis of the rotors. Dynamic analysis should be understood to include not only the conventional measures taken on a rotating rotor, of the dynamic loads on the blades, the hub and the control chain (flight control actuators, cyclic plates and pitch control rods, for example) of the rotor, but also one or more of the following points:

the frequency diagram, that is to say the determination of the position, with respect to the rotational speed and its multiples, of the characteristic frequencies of the blades at the various rotational speeds (spin-up, rated speed, maximum speed) and for the various movements of the blade, in flapping, drag and pitch, this frequency diagram being one of the main components of the dynamic optimization of a helicopter rotor, the analysis of the stability of the rotor (blades and hub) when isolated, by measurement of the damping of the various modes, particularly drag damping, the analysis of the stability of the rotor-power train assembly, and other requirements, such as the dynamic optimization of new hubs or rotors, for example of rigid hubs and of rotors with inter-blade links.

With the aim of meeting the various requirements for tests on the various classes of gyrocraft, and in particular of helicopters, the invention proposes a rotor test rig which is easily adaptable and makes it possible to carry out, at full scale, various types of tests in three different configurations:

dynamic test configuration, in which a main rotor, alone or with flight controls, is mounted on the rig and driven by a motor of the rig, while being subjected to multicyclic excitations, for example using electric or electrohydraulic servocontrol jacks exciting the flight controls of the main rotor, for the study of its dynamic behavior, endurance test configuration, in which a complete propulsion assembly may be mounted on the rig, this assembly including a main rotor and a rear rotor, which are driven by at least one power plant, preferably a turbine engine unit, linked to the rotors by a main gearbox and a rear gearbox and by the corresponding transmissions, the complete propulsion assembly being subjected to repeated forces and operating cycles, in terms of the abovementioned components of the propulsion assembly and/or of the flight controls for the two rotors, as well as of various equipment items such as pumps, alternators, rotor brakes, and above all performance test configuration, in which a main rotor is mounted on the rig and made up of blades driven by a hub jig which is specific to the model of rotor on test, and allowing an inverted mounting of the blades, in such a way that, when it is driven by the motor of the rig, the rotor operates in inverted mode, and delivers thrust downwards, in order to make it possible precisely to measure the pure aerodynamic characteristics and performance of the main rotor, to full scale, out of ground effect.

With the main aim of allowing full-scale hovering flight performance tests out of ground effect, the rig is characterized in that it comprises:

- a motor with substantially vertical axis, anchored in a foundation block on a substantially horizontal test area, and intended to drive at least blades of a main rotor at least in performance test configuration,
- a main mechanical framework, with a shell structure housing the motor, and also anchored in the foundation block,
- a transmission, comprising at least one lower shaft line above the motor and driven in rotation by the latter, and supported by the main framework while being guided in the latter in alignment and in the extension of the output shaft of the motor,
- an interface for measurement of the moments and forces generated by at least said blades of the main rotor at least in performance test configuration, said interface comprising a main balance supported by the main framework,
- a framework height extender, also with a shell structure, of upwardly convergent shape, mounted on the main balance in main rotor blade performance test configuration,
- at least one upper shaft line of the transmission, supported and guided in the height extender so as to be driven in rotation by the lower shaft line in the extension of which said upper shaft line is connected by coupling means,
- a main inverse thrust rotor mast, equipped with blade pitch control means, and mounted on the height extender so as to prolong said upper shaft line while being integral in rotation therewith;, and constituting a rotational drive interface for at least one inverse thrust rotor hub jig, intended to support said inverted, variable-pitch main rotor blades, by presenting their upper surface towards the ground, in such a way that, by driving said blades by the motor in the opposite direction of rotation to the normal direction of rotation of said blades, thrust is exerted downwards on the main rotor mast with inverse thrust, in blade performance test configuration.

Advantageously, the inverse thrust mast is coupled in rotation to the upper shaft line by means of a drive power measurement interface comprising a torque meter.

In order precisely to establish the power-lift curve of the blades of the main rotor, the inverse-thrust mast is advantageously mounted in rotation and supported by an interface for measuring the axial thrust of said main rotor blades in performance testing, said interface comprising a second balance supported by the height extender, and which is a precision balance.

The second balance comprises two rigid, annular, flat and substantially horizontal plates, one of which is a lower plate fixed to the peak of the height extender and the other an upper plate supporting an inverse-thrust mast rotational bearing.

By virtue of the two balances and the torque meter, the test rig of the invention makes it possible to measure the force and the power at the rotor mast over a significant range of lift, including under "hovering flight" conditions with the rig out of ground effect, and without the center of the rotor being at a height greater than the minimum theoretical height of twice the diameter of the rotor in order to be out of ground effect, due to the inverted thrust delivered by the rig in this test configuration. The variation in inverse thrust is obtained by the fact that the inverse-thrust mast is equipped with a blade pitch control device in performance testing, said device comprising a cyclic-plate mechanism actuated by three electric jacks.

The transmission of the test rig, consisting of the lower shaft line in the framework, and of the upper shaft line in the height extender, links the vertical output shaft of the motor to the inverse-thrust mast in the performance test configuration.

Moreover, for the purpose of advantageously being able to use the rig for dynamic and endurance tests, the motor is reversible, and the inverse-thrust mast, the upper shaft line of the transmission and the height extender are removable elements used only in main rotor blade performance test configuration, and intended to be linked respectively in a removable way to said blades by means of said hub jig, coupled by removable coupling means to the lower shaft line and fixed by fixing means, which can be dismantled, to the main balance, which, after removing the height extender, of the inverse-thrust mast and of the upper shaft line, constitutes a support platform for at least one main rotor in dynamic test configuration, and intended to be driven by the motor in the direction of rotation opposite to that of the blades in performance test configuration, or of at least one propulsion assembly in endurance test configuration, and comprising a main rotor and at least one heat engine for driving said main rotor, so that the test rig is multi-purpose.

When a main rotor with its pitch control chain is mounted on the main balance, in dynamic test configuration, the rig of the invention makes it possible to establish the frequency diagram by analysis of the frequency response of the rotor excited, for example, by means of the pitch control chain comprising cyclic plates the non-turning plate of which is excited by short-travel dynamic jacks. Moreover, by virtue of the motor of the rotor rig of the invention, it is possible, via the abovementioned excitations, to know the positions of the characteristic frequencies at various intermediate stabilized speeds, which is not possible on a helicopter in the course of spin-up. In this configuration for dynamic test of a main rotor, the test rig of the invention allows analysis of the stability of the rotor by analysis of the transient response of the rotor after cutting off the excitation of the pitch control chain by the abovementioned short-travel jacks.

For the dynamic studies on a rotor, the test rig of the invention also has the main advantages, with respect to on-helicopter tests, of the quality of the measurements, safety (above all for stability studies), flexibility of use, and the capability of carrying out tests which are impossible or difficult on helicopters, such as tests at stabilized intermediate speeds, and tests with excitation by the pitch control chain, when the helicopter is not equipped with high-frequency jacks.

In endurance test configuration, the rotor rig of the invention makes it possible to accommodate the complete power train, that is to say the power plant, the main and auxiliary gearboxes, the main and rear rotors, as well as the transmissions which link them, if the rig advantageously additionally comprises a tail boom jig, specific to the model of helicopter on test, a front part of which is fixed by removable fixing means to the main framework, while a rear part of which supports an anti-torque rotor of the propulsion assembly and its auxiliary gearbox linked by a transmission shaft to a main gearbox also belonging to the propulsion assembly of which it drives the main rotor.

For preference, the tail boom jig has an annular front part which is fixed removably around the main balance and onto the peak of the main framework, and it comprises, in its central part, a flexible decoupling part around a substantially vertical axis, so that the transverse thrust of the rear rotor does not apply too great a moment to the fixing of its front part onto the main framework.

Advantageously, the test rig also comprises an interface for measuring the transverse thrust of the anti-torque rotor. In this case, the rig also comprises an auxiliary mechanical framework, bearing on the test area in the region of the anti-torque rotor, and equipped with a mechanism, plate, mounted preferably adjustable in height on the auxiliary framework, and intended to support the interface for measuring the transverse thrust of the anti-torque rotor. The auxiliary framework is a support structure, preferably triangular, and asymmetric in order, by being turned round, to make it possible to place the force sensor to the left or to the right of the tail boom jig, according to the position of the rear rotor, and adjustable in height with the mechanism plate as well as in longitudinal position (in the direction of the tail boom jig) with the auxiliary framework, in order to adapt the fixing point of the force sensor to the rear rotor on test.

The main balance, constituting a standard interface for measuring the moments and forces generated by the main rotors on test in the various configurations, comprises two rigid, annular, flat and substantially horizontal plates, one of which is a lower plate fixed to the peak of the main framework, and the other of which is an upper plate supporting the retaining bearing of the lower shaft line of the transmission on the main framework. The upper face of the upper plate of the main balance is flat, so as to facilitate the fixing of the equipment to be tested, possibly with the interposition of a fixing interface, functionally equivalent to a helicopter transmission platform.

The shell structure of the main framework has a rigidity such that it advantageously exhibits a characteristic frequency greater than about 30 Hz in the six degrees of freedom, in order not to disturb the dynamic measurements performed on the rotors on test, and it moreover exhibits the advantages of a good rigidity/weight ratio and of simple manufacture if the shell is a closed structure of cylindro-conical shape offering a much better aerodynamic profile than a tubular structure, and facilitating fighting an internal fire, such as a fuel fire. Advantageously, the main framework comprises, at its lower part, a cylindrical shroud surrounding the motor, and prolonged, at the upper part, by a frustoconical shroud converging upwards and forming a casing equipped with a servicing platform above the motor. The main framework and the motor are advantageously fixed to a common base part, comprising a rigid and annular plate for anchoring into the foundation block, and preferably wedges or other similar elements projecting from this plate, for positioning the framework and the motor on the plate.

As is known, the test rig also comprises electrical and fluid services, which are necessary for its operation as well as for that of the facilities on test on the rig in the various configurations.

Obviously, like the majority of test rigs, the rig of the invention also comprises means for measuring and controlling the rotors or propulsion assemblies on test, these means making it possible, on the one hand, to carry out acquisition, storage and processing of the measurements taken on various measurement channels, fixed or rotating, and, on the other hand, to control, monitor and ensure the safety of the whole of the test rig and of the facilities on test on this rig.

BRIEF DESCRIPTION OF THE DRAWINGS

Other characteristics and advantages of the invention will emerge from the description given below, in a non-limiting context, of an example embodiment described with reference to the attached drawings in which.

DESCRIPTION OF THE PREFERRED EMBODIMENTS

Figure 1:
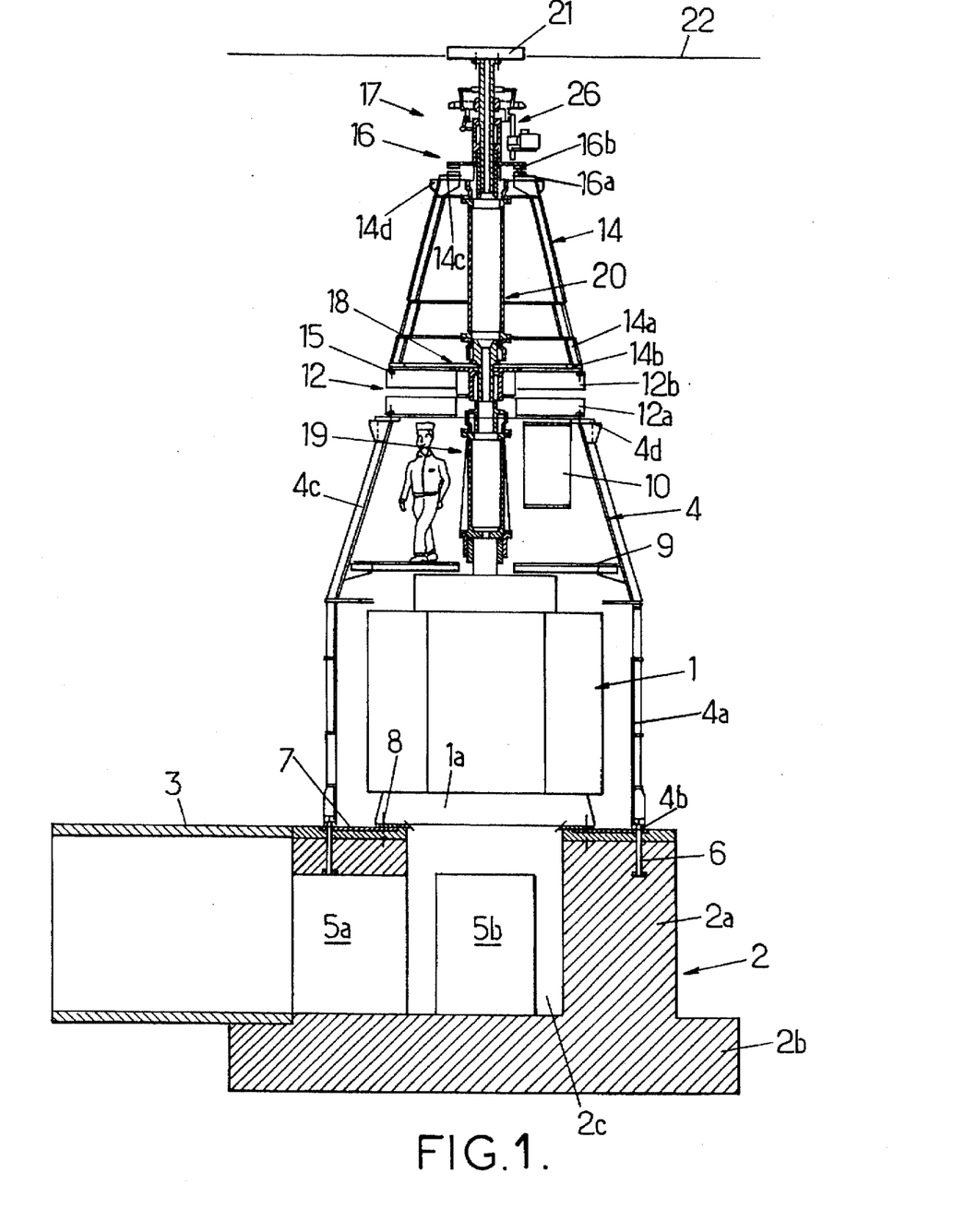
FIGS. 1, 2 and 3 are diagrammatic views, partially in axial section and partially in lateral elevation, of the test rig in the performance, dynamics and endurance test configurations respectively.
Figure 2:
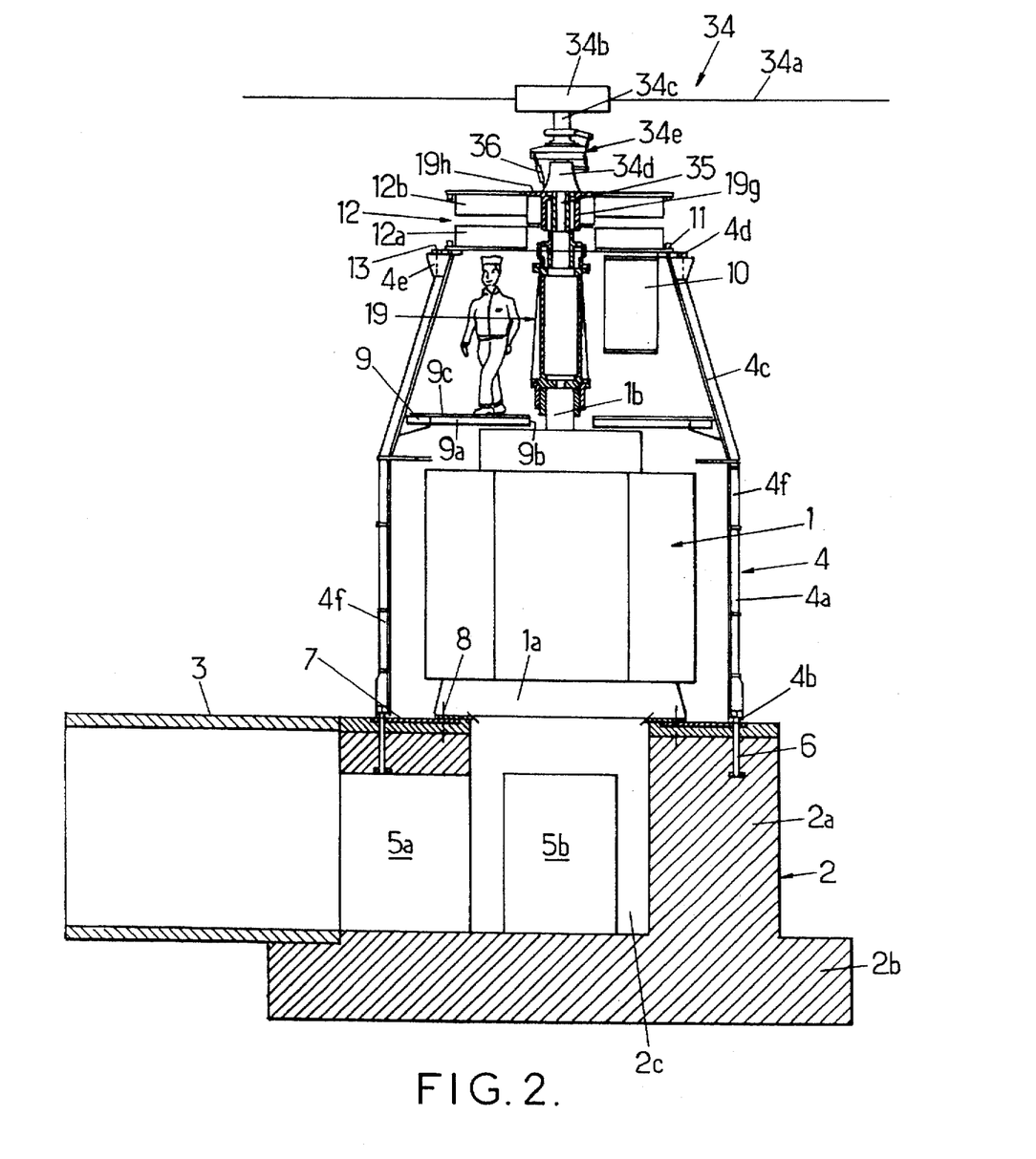
Figure 3:
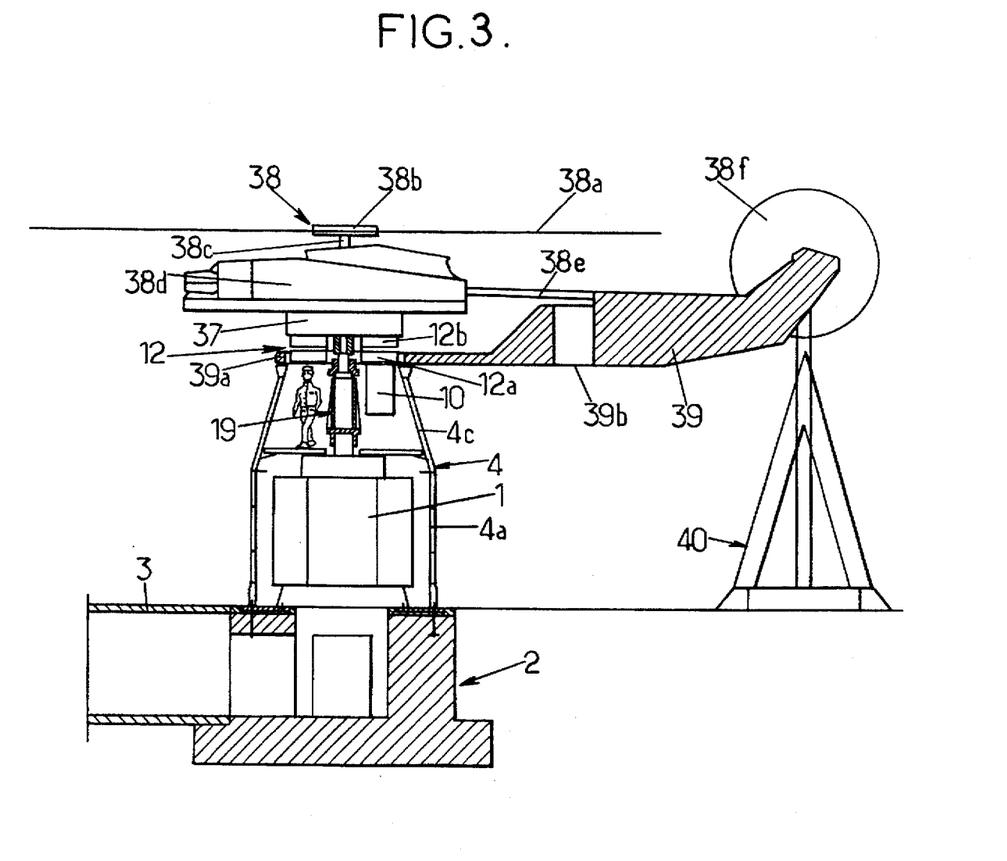

With reference to FIGS. 1 to 3, the test rig comprises a reversible motor 1, with vertical axis, anchored by its base 1a onto a foundation block 2, in the ground of the installation site, at the center of a horizontal and flat slab 3, free of obstacles, for example of circular shape, bounding, around the motor 1 and a main framework 4, which covers the motor 1 and is also anchored to the block 2, a test area which is sufficiently large for the surrounding obstacles to have a negligible aerodynamic influence on the tests, particularly in performance configuration (FIG. 1). The slab 3 is made of concrete, as is the block 2 consisting of two superimposed cylinders 2a, 2b with an octagonal base, the upper cylinder 2a comprising a central well 2c which communicates with two technical galleries 5a and 5b, formed under the slab 3, and in which are housed cables and ducting for electrical and fluid circuits linking the framework 4 and the motor 1 to two separate buildings (not represented in the figures), placed at the edge of the test site, one of which is a measurements building, housing the means of processing the measurements and of controlling the rig and the equipment on test, and the other a services building, at least partially housing the various electrical, hydraulic and other services necessary for the operation of the whole of the installation.

The motor 1 has a range of speed variation from 0 to 500 rpm, its nominal speed being 250 rpm, and, at this nominal speed, delivering power on its vertical output shaft 1b of 3000 kW. At this speed, it delivers a nominal torque of about 11500 mdaN and, for 30 min starting from cold, and in exceptional operation, can deliver a torque of 15000 mdaN. The motor 1 can be stabilized in rotation at any speed intermediate between 0 and 250 rpm. It delivers a constant torque for a speed lying between 50 and 250 rpm, and a constant power between 250 and 500 rpm. The motor 1 may also be controlled so as to deliver fluctuations in motor torque, in dynamic test mode (FIG. 2).

The framework 4 is a mechanically assembled/welded structure made as a rigid shell, of cylindro-conical shape, the characteristic frequency of which is greater than about 30 Hz in the six degrees of freedom, in order not to disturb the dynamic measurements taken on the rotors on test. The framework 4 consists essentially of a cylindrical shroud 4a, surrounding the motor 1, of a lower flange 4b, at the base of the shroud 4a for linking to the block 2, of a frustoconical shroud 4c integral, via its large base, with the upper extremity of the cylindrical shroud 4a, and of an upper flange 4d fixed to the small base of the frustoconical shroud 4c by linking gussets, some of which are equipped with lifting lugs 4e, allowing the framework 4 to be handled with a crane for putting it in place around the motor 1. The lower flange 4b is annular and pierced with 24 holes distributed in a crown over its periphery, for passing through rods 6 for anchoring into the block 2, these rods 6 also passing through a common base part 7 for fixing the motor 1 and the framework 4 to the block 2. This base part 7 is an annular steel plate pierced, in proximity to its external radial periphery, with 24 holes, opposite those of the lower flange 4b for passing the rods through, and, in proximity to its central opening, with holes for fixing the motor 1 by its base 1a to the base part 7 by a ring of bolts 8. The framework 4 is positioned on the base part 7, for example, by means of wedges fixed to the base part 7 at the first mounting or with the aid of centering pins (for example three pins at 120°), on the periphery of the base part 7 and accommodated in housings of the lower flange 4b. This base part 7 conducts the forces generated by the rotors on test onto the framework 4, as described below, and the forces for retaining the motor 1 down to the foundation block 2, and constitutes a reference for the respective positioning of the framework 4 and of the motor 1, and for ensuring that the framework 4 is vertical within the demanded tolerance.

Access to the exciters of the motor 1 is permitted via two diametrically opposite apertures pierced in the 14 mm thick steel wall of the cylindrical shroud 4a, and blocked by removable hatches 4f.

The frustoconical shroud 4c is also made of 14 mm thick steel, and constitutes a services chamber, pierced by an aperture, allowing access into this chamber, and closed by a hatch (not represented) in order to ensure confinement of an extinguishing agent, such as halon, injected into this chamber in the event of fire.

At the lower part of the inner face of the frustoconical shroud 4c an annular servicing platform 9 is fixed, consisting of profiled sections for support 9a, which are radial with respect to the vertical axis of the framework 4, of a central ring 9b, linking the profiled sections 9a to one another, and of an upper sheet metal plate 9c. This platform 9 allows access to the upper part of the output shaft 1b of the motor 1, as well as to the brake (not represented) of this motor, to a lower part 19, mounted permanently in the frustoconical shroud 4c, of a transmission 18 described below, coupled to the upper extremity of the shaft 1b of the motor and in its extension for driving a main rotor on test, and to components capable of being mounted in the frustoconical shroud 4c or on the outer face thereof, and belonging to electric circuits or fluid-transport circuits of the monitoring, control and services systems. In the frustoconical shroud 4c there is fixed, in particular, a buffer tank 10 of fuel for a fuel (kerosene) supply circuit of a heat engine (turbine engine) of a complete propulsion assembly on endurance test (FIG. 3), and a tank of extinguishing agent of a fire protection circuit, a unit for regulating a hydraulic power circuit, and boxes for electrical power supply connections, as well as electrical cabinets and racks of circuits for measurements and for controlling the rig and the equipment on test may be fixed to the outer face of the shroud 4c. The latter may be equipped with through feeds for passing electrical cables and pipework for fluids (hydraulic and fuel), leading from the technical galleries 5a and 5b to the equipment on test.

The upper flange 4d is a rigid ring pierced with two concentric crowns of holes (for example 18), distributed in a circumferential direction, the inner crown of holes making it possible to fix, horizontally on the upper flange 4d and by the use of bolts 11, the lower flat, rigid and annular plate 12a of a main balance 12, which is centered and positioned in angle on the framework 4 by a centering pin and an orientation pin, diametrically opposite and projecting from the upper face of the upper flange 4d, and housing these, respectively without play and with radial play, in two holes of the lower face of the lower plate 12a of the balance 12. The outer crown of holes 13 of this flange 4d allows fixing, onto the framework 4, of a tail boom jig 39, specific to a complete propulsion assembly of a helicopter on endurance test, as described below by reference to FIG. 3.

The main balance 12 also comprises an annular, rigid and flat upper plate 12b, like the lower plate 12a, and arranged above the latter, to which it is linked by force sensors allowing the measurement of the six components of a wrench of forces generated by a main rotor on test. For example the main balance 12 may comprise six unidirectional sensors mounted between its two plates 12a and 12b and oriented in an isostatic layer, these sensors consisting of test bodies equipped with strain gauges and decoupled from the transverse forces.

The main balance 12 is also equipped with safety end stops, making it possible to maintain the overall stability of the upper plate 12b on the lower plate 12a even in the event of a sensor breaking, and it can moreover be equipped with fastening points in order to carry out an on-site periodic verification of its calibration on known wrenches.

The test rig also comprises a shell-structure height extender 14, which is removable as it is used only in performance test configuration, and consisting (see FIG. 1) of a frustoconical shroud 14a and of lower 14b and upper 14c flanges assembled to the shroud 14a by welding and by the use of gussets. The frustoconical shroud 14a comprises a 10 mm thick steel wall converging upwards and pierced by two diametrically opposed apertures (not represented), allowing access to an upper part 20, removable with the height extender 14 in which it is mounted, of the abovementioned transmission 18, coupling to the output shaft 1b of the motor 1, and the lower part 19 of which is housed in the frustoconical shroud 4c of the framework 4.

The lower flange 14b of the height extender 14 is annular and pierced by 18 holes distributed in a crown around its axis for fixing by bolts 15 onto the periphery of the upper plate 12b of the main balance 12. Between the fixing holes, the lower flange 14b exhibits two diametrically opposed holes, one for accommodating a centering pin, with precision, and the other for receiving an orientation pin, with radial play, which are projecting from the upper face of the upper plate 12b, for fixing the height extender 14, centered and oriented in terms of angle, onto the balance 12.

The upper flange 14c of the height extender 14 is linked to the frustoconical shroud 14a by gussets 14d equipped with lifting lugs allowing the height extender 14 to be handled. This upper flange 14c is annular and pierced by 12 holes distributed in a crown around its axis for fixing the lower rigid annular plate 16a of a secondary precision balance 16, mounted on the height extender 14. The upper flange 14c carries a centering pin and an orientation pin, projecting from its upper face, which are housed, respectively with precision and with radial play, in two diametrically opposed holes in the lower plate 16a, the hole receiving the orientation pin being radially oblong. The precision balance 16 also comprises an upper annular rigid plate 16b, arranged above the lower plate 16a to which it is linked by force sensors, for example three unidirectional sensors with strain gauges placed at 120° from one another and articulated to the plates 16a and 16b by ball joints, safety end stops making it possible to maintain the overall stability of the balance 16 even in the event of the breaking of a force sensor.

The upper plate 16b of the balance 16 is linked to a rotation bearing of a main rotor mast 17, with inverse thrust, described below by reference to FIG. 6, and intended to support the hub jig 21, to which are coupled the blades 22 of a main rotor in performance test mode, the assembly being configured so that the thrust developed by the main rotor is directed downwards.

The rotational drive for the rotor mast 17 from the motor 1 is provided by the transmission 18, described below by reference to FIG. 5, and consisting essentially of the two parts 19 and 20 being coupled removably to one another, in order to make it possible easily to produce the various configurations, and one of which is a lower shaft line 19, coupled by its base to the shaft 1a of the motor 1, and mounted in the frustoconical shroud 4c of the framework 4, so that it is not necessary to dismantle it in order to change from one configuration to the other. The other part is an upper shaft line 20, mounted in the height extender 14 and removable therewith, while being coupled at the upper part with the base of the main rotor mast 17.

These two shaft lines 19 and 20 are rigid in torsion, and each has small clearances. So as to compensate for misalignments, which are inevitable on assembly, between the various bearings, the shaft lines 19 and 20 are coupled to the driving and driven elements by standard toothed couplings and flexible joints, of the type commonly called flector, allowing easy assembly and disassembly of the transmission 18 by means of flanges, between which the flectors are mounted in order to avoid the transmission of coaxial forces disturbing the operation of the measurement balances 12 and 16.

This transmission 18 ensures the mechanical continuity for the transmission of the motor torque between the motor 1 and, in performance test configuration (FIG. 1), the inverse-thrust rotor mast 17, by virtue of the two shaft lines 19 and 20, (the latter, situated in the height extender 14, being used only with it for performance tests), or between the motor 1 and, in dynamic test configuration (FIG. 2), the mast 34c of a main rotor 34 on test, and mounted on the main balance 12, by virtue of the lower shaft line 19 alone, installed permanently in the framework 4.

Figure 5:
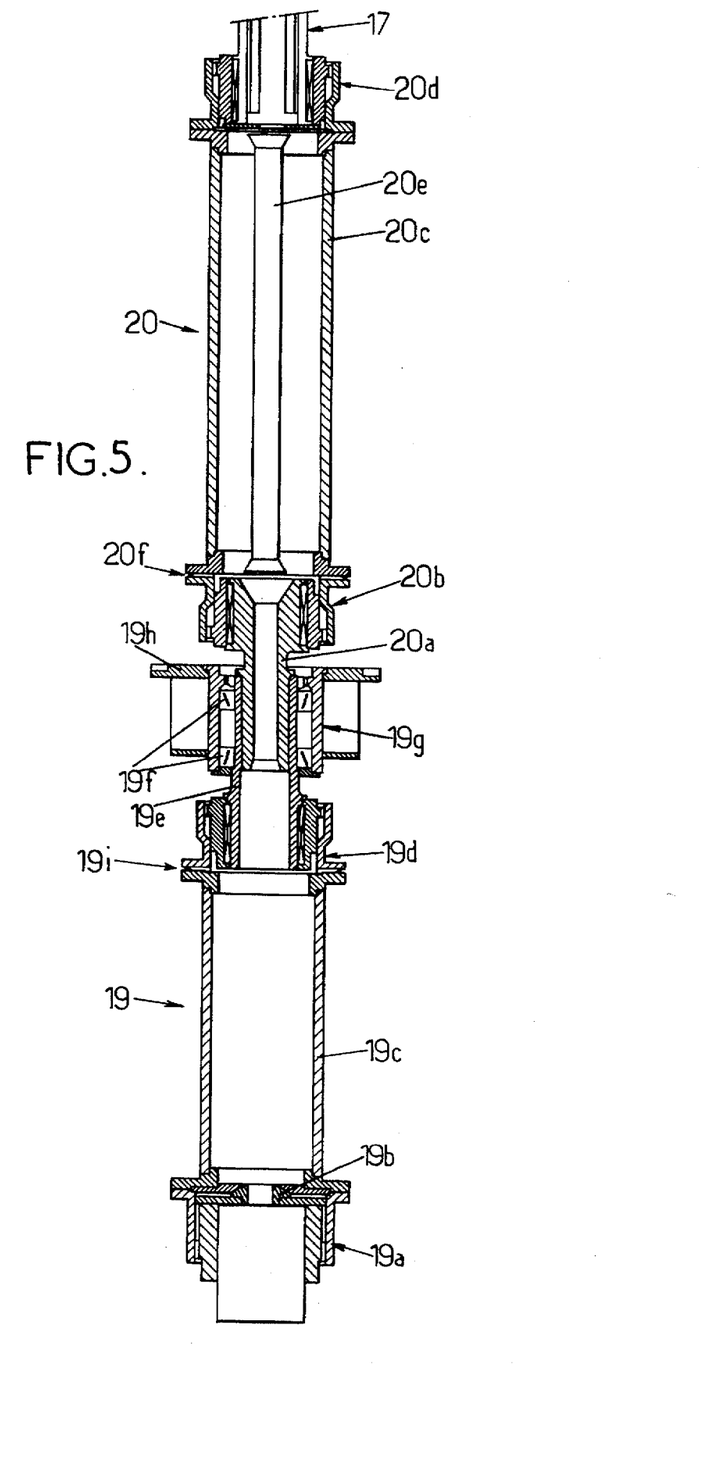
FIG. 5 represents the transmission, in axial section, as used in the performance test configuration of FIG. 1, and of which only the lower part is used in the dynamics and endurance test configurations of FIGS. 2 and 3, FIGS. 5a, 5b and 5c partially represent a flexible joint called "flector" of the transmission of FIG. 5, respectively in axial half-section, developed along a lateral elevation, and from above.

In the transmission example 18 represented in FIG. 5, the lower shaft line 19 comprises a lower toothed half-coupling 19a, which is standard and is fixed onto the upper extremity of the shaft 1b of the motor 1, and which includes a central spherical dowel 19b, in the form of a spherical cap around a central passage, and on which bears an annular lower extremity plate of a hollow intermediate shaft 19c, bolted to the half-coupling 19a by radial flanges. The upper extremity of the shaft 19c is linked by a flector 19i, described below by reference to FIGS. 5a to 5c, and mounted between radial flanges, to a standard toothed upper half-coupling 19d of the shaft line 19, and engaged with the lower part of a tubular end shaft 19e, the upper part of which is, on the one hand, equipped with internal axial splines, to constitute the female part of a spline coupling, and, on the other hand, mounted in rotation and retained by two spaced bearings 19f within an intermediate bearing 19g integral, via an upper radial flange 19h with the center of the annular rigid upper plate 12b of the main balance 12. Hence this intermediate bearing 19g supports the lower shaft line 19 on the upper plate 12b of the main balance 12, and hence with respect to the framework 4. In dynamic (FIG. 2)or endurance (FIG. 3) test configuration, the upper part of the lower shaft line 19 does not project past the upper plate 12a of the balance 12. The end shaft 19e of the shaft line 19 provides the function of drive interface via its upper part, the internal splines of which constitute the female splines of a standard spline coupling. The male part of this spline coupling, in performance test configuration (FIG. 1), consists of the lower part, with external axial splines, of a tubular lower shaft 20a of the upper shaft line 20.

In dynamic test configuration (FIG. 2), the male part of the standard spline coupling is a tubular shaft segment 35, equipped with external axial splines both in its lower part, in order to be integral in rotation with the end shaft 19e, and in its upper part, in order to be integral in rotation, via a flector, with the mast 34c of a main rotor 34 mounted, in dynamic test, on the upper plate 12b of the main balance 12. This double-spline tubular shaft segment 35 is an interface component adapted to each type of rotor 34 on dynamic test.

In the upper shaft line 20, the upper part of the lower splined shaft 20a is engaged in a standard toothed lower half-coupling 20b, fixed by a flector 20f between flanges at the lower extremity of a hollow intermediate shaft 20c, the upper extremity of which is fixed by flanges bolted to an upper toothed half-coupling 20d, also standard, and by which the upper shaft line 20 is coupled to the base of the inverted-thrust main rotor mast 17.

Figure 5A:
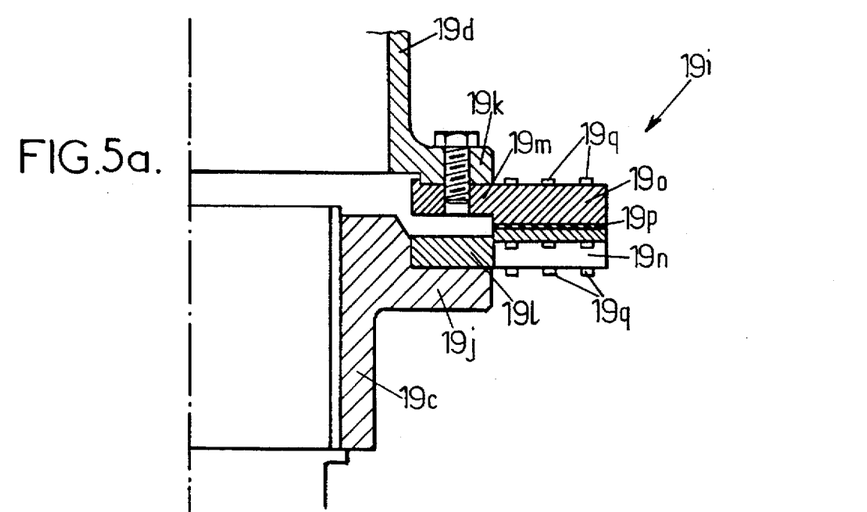
Figure 5B:
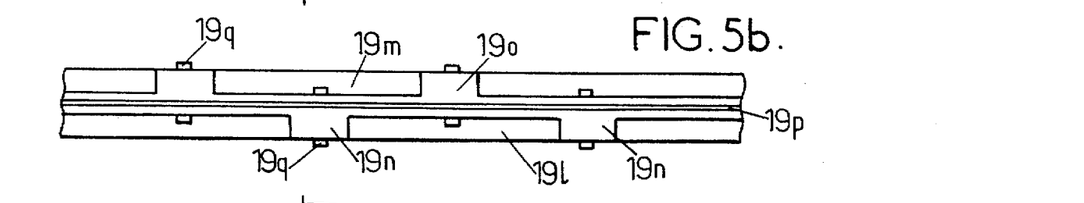
Figure 5C:
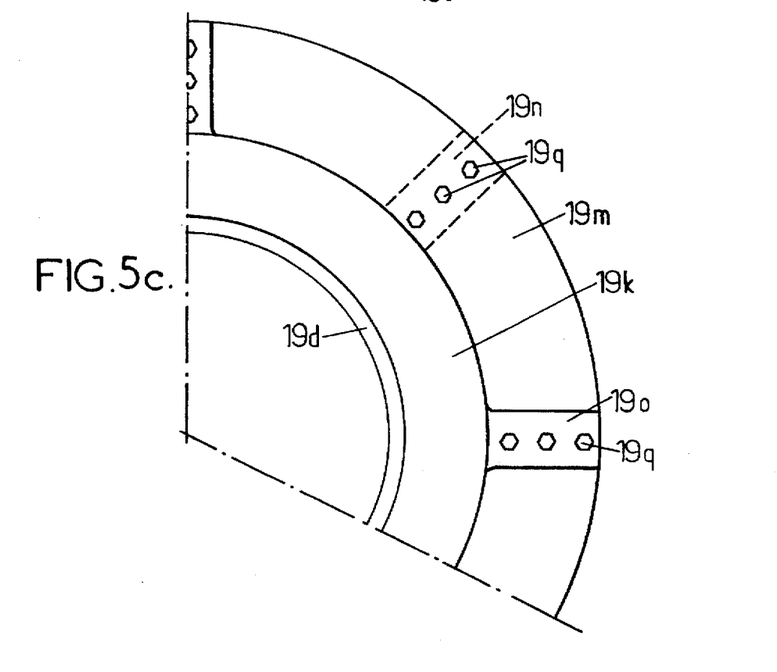

The flector 20f is of identical structure to that of the flector 19i described here by reference to FIGS. 5a to 5c: it comprises two annular crowns 19l and 19m, opposite each other, each bolted through its thickened inner radial part respectively to an upper flange 19j of the shaft 19c and to a lower flange 19k of the half-coupling 19d. Each crown 19l and 19m has a thinned outer radial part, separated from the thinned part facing the other crown by a flexible layer 19p of an elastically deformable material. The thinned part of each crown 19l, 19m is additionally reinforced, on the side opposite the layer 19p, by radial projections 19n and 19o regularly distributed in the circumferential direction and belonging alternately to these crowns 19l and 19m. The crowns 19l and 19m are linked in rotation to one another by bolts 19q which pass through the flexible layer 19p and the projections 19n and 19o, in such a way as to transmit the rotational drive by the shaft line without transmitting axial forces, by virtue of the presence of the flexible layer 19p.

A tube 20e, made of plastic, is arranged in the shaft 20c in order to guide the electrical instrumentation cables linking the rotating measurement sensors, installed on the apparatus on test, to a rotary collector at the base of the motor 1, passing through the transmission 18 which is tubular.

The inverse-thrust rotor mast 17 used with the height extender 14 for performance tests on blades 22 of a helicopter main rotor provides transmission of the torque between the transmission 18, driven by the motor 1, and a rotor hub jig 21, supporting said blades 22, and one embodiment of which is described below by reference to FIGS. 7 and 8. The rotor mast 17 also allows measurement of the drive torque, via a precision torque meter linking it to the upper shaft line 20, and control of the pitch of the blades 22 of the rotor via a device 26 of a structure similar to the known cyclic-plate mechanisms used on helicopter main rotors.

This tubular rotor mast 17 allows instrumentation cables to pass through, which also pass through the transmission 18, and provides the interface with the upper shaft line 20, with the precision balance 16 fixed above the height extender 14 and constituting a sensor for the vertical downwards thrust transmitted by the blades 22 of the main rotor in rotation on the inverse-thrust rotor mast 17, and finally with the hub jig 21, fixed to this mast 17 and supporting the blades 22.

Figure 6:
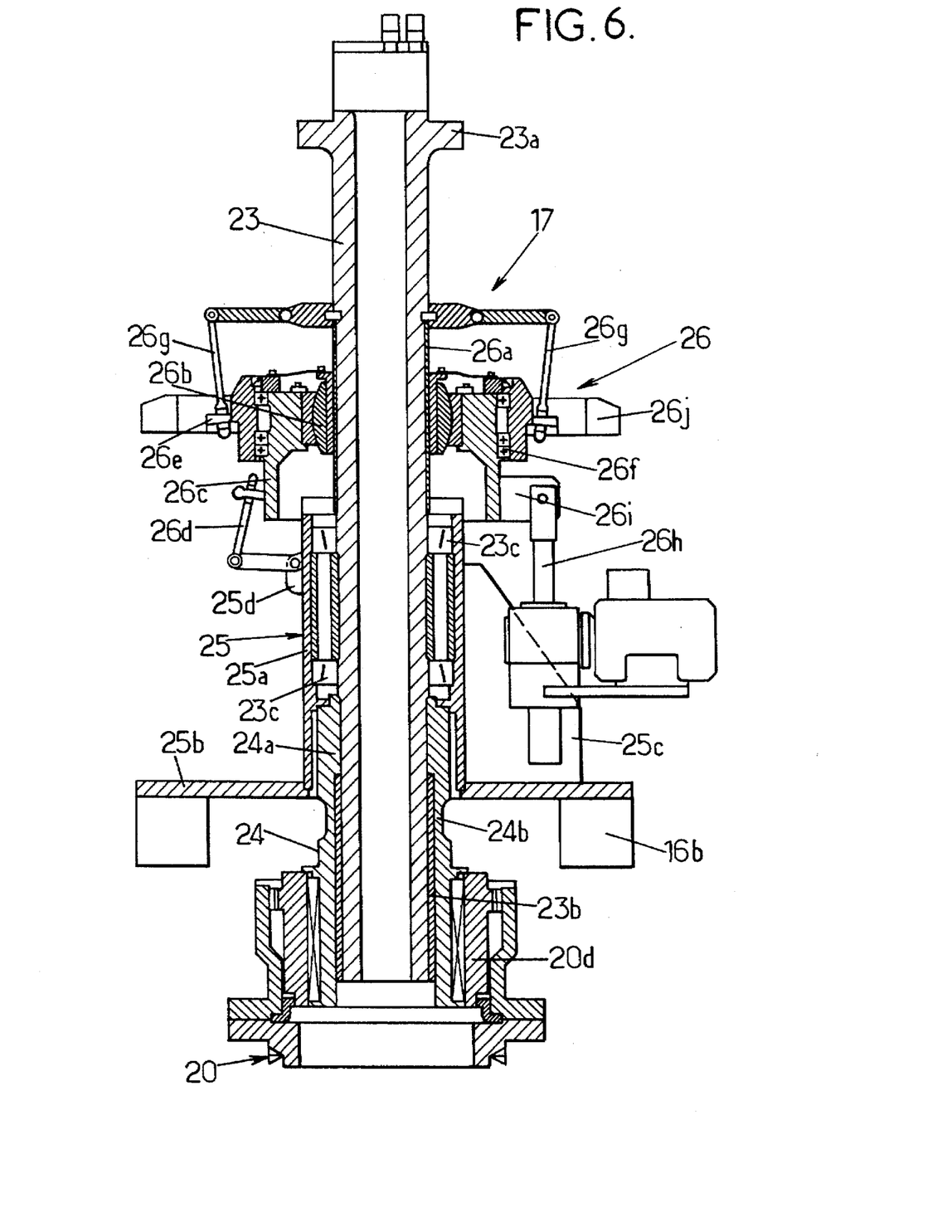
FIG. 6 is a diagrammatic view partly in axial section and partly in lateral elevation of the inverse-thrust rotor mast, used in the performance test configuration of FIG. 1, and FIGS. 7 and 8 represent, diagrammatically and partially, respectively in lateral elevation and in plan view, an example of a main rotor hub jig mounted on the inverse-thrust rotor mast of FIG. 6.

As represented in FIG. 6, this rotor mast 17 consists essentially of a tubular central shaft 23 equipped, at its base, with the precision torque meter 24, and, around its central part, with a support structure 25 and with a pitch control device 26.

The central shaft 23, at its upper extremity, has a radial flange 23a for fixing the hub jig 21 of the inverse-thrust main rotor, while its lower part has outer axial splines 23b, which allow the torque meter 24 to be mounted. In its central part, the shaft 23 is mounted in rotation and axially retained by two roller bearings 23c axially spaced in an upper bearing comprising a cylindrical shroud 25a of the support structure 25.

The torque meter 24 comprises a tubular shaft segment 24a, having internal axial splines, in engagement with the splines 23b of the central shaft 23, and formed in its lower part in engagement in the upper toothed half-coupling 20d of the upper shaft line 20. The central part 24b of the shaft segment 24a is thinned and equipped with strain gauges so as to constitute the torque meter proper, the electronic preconditioning circuits of which can be fixed to the half-coupling 20d of the upper shaft line 20. The torque meter 24 is thus configured as a linking piece between the central shaft 23 and the upper shaft line 20.

The support structure 25 comprises, in addition to the shroud 25a, an annular radial flange 25b, fixed, on the one hand, to the lower extremity of the shroud 25a and, on the other hand, to the upper plate 16b of the balance 16, so as to link the inverse-thrust rotor mast 17 to this balance 16. The support structure 25 also comprises three radial clevises, only one of which is represented at 25c, for fixing the pitch control actuators of the device 26, and finally a radial clevis 25d, at the upper part on the shroud 25a, for fixing the non-rotating scissors 26d of the pitch control device 26.

This device 26 comprises a guide sleeve 26a, mounted around the central part of the shaft 23, and along which a ball joint 26b slides axially, on which, in any direction around the shaft 23, a non-rotating plate 26c can be inclined, on which is articulated the upper end of the non-rotating scissors 26d articulated by its lower end in the clevis 25d of the support structure 25. The pitch control device 26 also comprises a rotating plate 26e mounted so as to rotate around the non-rotating plate 26c by the use of roller bearings 26f. The rotating plate 26e is driven in rotation by the shaft 23 by the use of two rotating drive scissors 26g. The axial and angular position of the plates 26c and 26e is determined by three pitch control actuators which are electric jacks such as 26h, with a capacity of ±3000 daN, similar to the servocontrols of helicopter main rotors. Each electric jack 26h is articulated by its body into one of the clevises 25c and by the end of its rod in a respective one of three clevises such as 26i of the non-rotating plates 26c. Finally, the rotating plate 26e, on its periphery, has pierced holes making it possible, by nut and bolt assemblies, to fix a crown 26j equipped with radial clevises for articulating the lower ends of pitch control rods 27 of the blades 22 of the main rotor in performance test configuration, as represented in FIG. 7.

Figure 7:
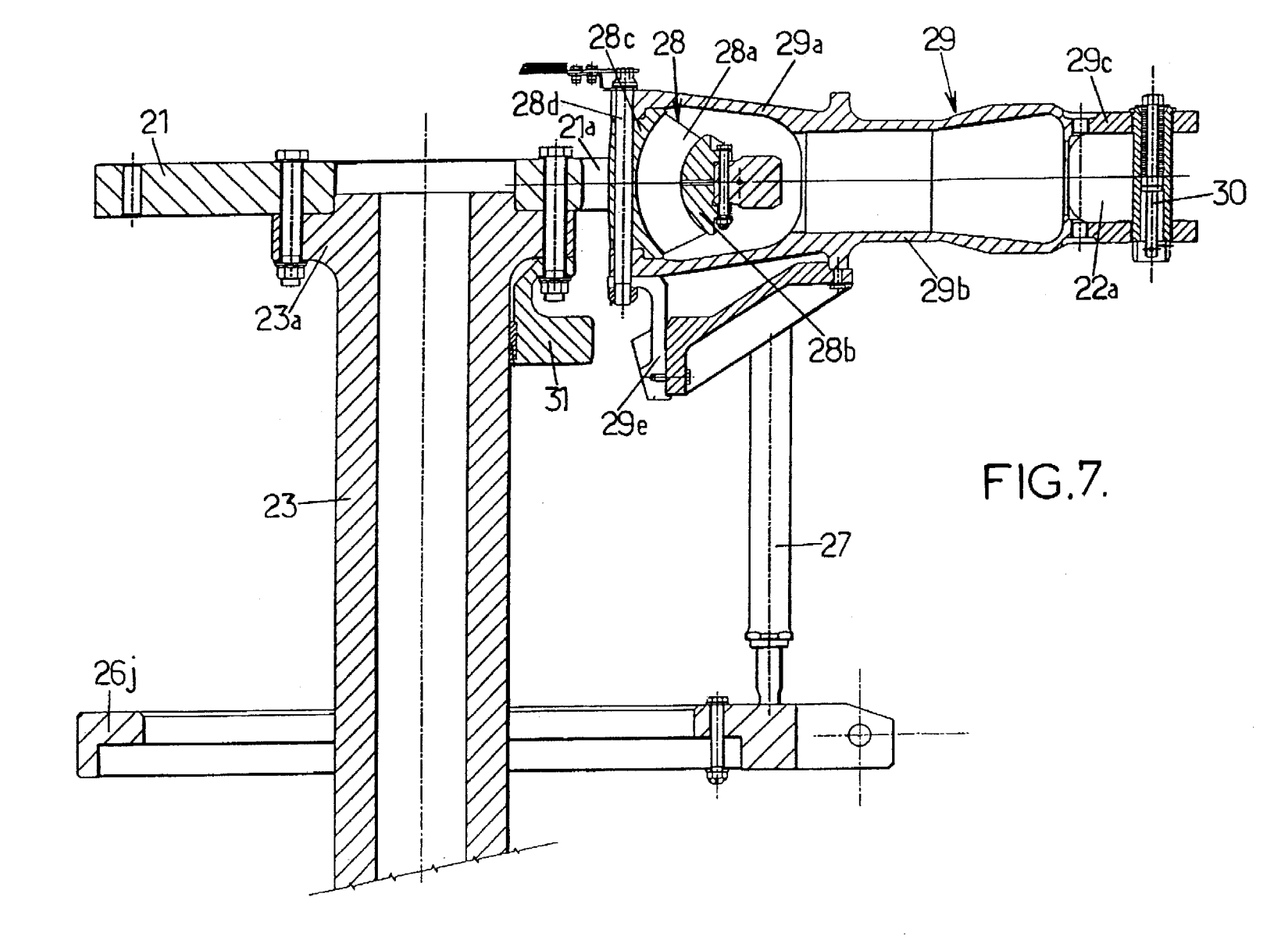
Figure 8:
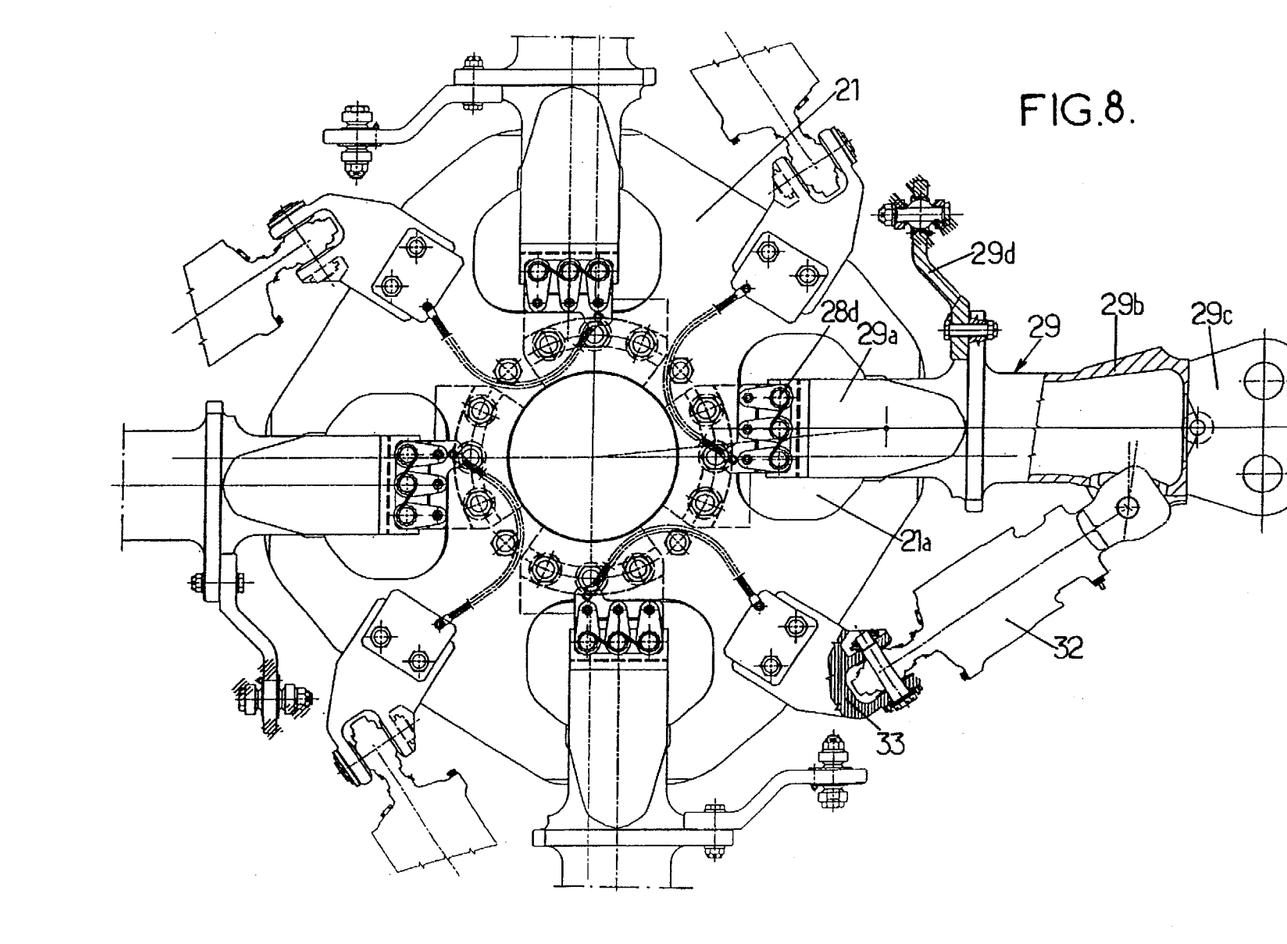

In FIGS. 7 and 8, the hub jig 21 of the inverse-thrust rotor is a flat and annular disc, bolted to the upper flange 23a of the central shaft 23 and having a cell 21a, for each plate 22, housing articulation means 28 linking the hub jig 21 with a radial element 29 connected to the corresponding blade 22. In this example, the articulation means 28 comprise a laminated spherical stop, of known structure, consisting of an alternate central stack of rigid and elastic layers, in the form of spherical cap, between an outer radial armature 28b fixed to the outer edge of the corresponding cell 21a, and an inner radial armature 28c fixed as a spacer by threaded studs 28d between the two branches of an inner radial clevis 29a of the linking element 29, arranged as a sleeve 29b in its central part, and, in its outer radial part, into a clevis 29c, between the two branches of which the root 22a of the corresponding blade 22 is retained by two parallel spindles 30.

The element 29 also, laterally, carries a pitch lever 29d articulated onto the upper extremity of the corresponding pitch control rod 27, and a lower flapping stop 29e is fixed under the inner clevis 29a in order to limit the downwards angular flapping of each blade by bearing of this lower stop 29e against a heel 31 fixed under the upper flange 23a of the central shaft 23.

The hub jig 21 also comprises a drag damper 32, for each blade 22, similar to those equipping helicopter main rotors, and the extremities of which are articulated by ball and socket joints, on the one hand, onto a lateral clevis of the corresponding sleeve 29b, on the side opposite the pitch lever 29d fixed to this sleeve 29b, and, on the other hand, into a clevis 33 attached to the hub jig 21 and projecting laterally therefrom, between two adjacent recesses 21a, including the one corresponding to the blade 22 in question.

The hub jig 21 thus equipped with a linking element 29 for each blade 22 is such that each blade 22 can be mounted inverted into the corresponding outer radial clevis 29c, that is to say that the underside of the blade 22 is turned upwards and the upper side towards the ground.

In this performance test configuration (FIG. 1), the motor 1 is supplied with power and controlled so as, via the transmission 18, to drive the rotor mast 17 and the hub jig 21 with the blades 22 in a direction of rotation contrary to the normal direction of rotation of the blades 22 normally mounted on a main rotor, so that the blades 22 generate an air flow directed upwards and exert, on the hub jig 21 and the main rotor mast 17, a vertical axial thrust directed downwards. Thus the thrust-power law in hovering flight is determined, out of ground effect and at full scale, the thrust being measured by the precision balance 16 and the power by the torque meter 25 which, like the balance 16, is mounted at the peak of the height extender 14. The presence of this height extender 14, as well as that of the rotor mast 17, in this configuration, has the effect of placing the rotor proper (hub jig 21 and blades 22) at a height, for example of the order of 9 m, which is sufficient to suppress any ceiling effect due to the ground, while being very much less than twice the diameter of the rotor on test (which may reach 17m), by virtue of the thrust exerted downwards, on a framework 4 which is aerodynamically discreet, particularly due to its cylindro-conical shape, prolonged by the frusto-conical shape of the height extender 14. In order to minimize disturbances on the measurements related to the aerodynamic effects, the upper plane of the upper plate 12b of the main balance 12 has an equivalent cross-section less than or equal to that of a disc of 2.5 m diameter, while at its upper level, the height extender 14 has an equivalent cross-section less than or equal to that of a disc of 1.7 m diameter.

This configuration makes it possible to determine the aerodynamic characteristics of the blades 22 of a helicopter main rotor, to full scale and out of ground effect, by installing the blades 22 on a hub jig 21 so that the thrust is inverted, that is to say directed towards the ground, the rotor being placed at a height which is sufficient to reduce the perturbing effect due to the ground, by installing the hub jig 21 on an inverted-thrust main rotor mast 17, situated at the upper part of a height extender 14 placed on the main balance 12 which is itself at the peak of the framework 4, the drive to the main rotor mast 17 and to the hub jig 21 being taken from the motor 1 by means of an upper shaft line 20 which prolongs the lower shaft line 19 while being, like the latter, aligned in the extension of the output shaft 1b of the motor 1.

This performance test configuration allows measurement of the vertical thrust, with precision of ±0.5% over the range of measurement, by the precision balance 16 mounted as a measurement interface between the height extender 14 and the rotor mast 17, the measurement of the motor torque, also with a precision of ±0.5% over the range of measurement, by the torque meter 24 mounted as an interface between the upper shaft line 20 and the rotor mast 17, measurement of the moments and forces generated by the main rotor, with a precision of ±1% of the range of measurement, being provided by the main balance 12, mounted as a standard interface for measuring forces between, on the one hand, the framework 4, and, on the other hand, the height extender 14 and the main rotor on test in this configuration, or the equipment items on test in the other configurations.

In performance testing, the height extender 14 supports the balance 16, the upper shaft line 20, and the main rotor mast 17 (by means of the balance 16), and provides for the transfer of the moments and forces which are generated by the rotor on test to the main balance 12. The framework 4 supports not only the balance 12, but also the height extender 14, the balance 16, the upper shaft line 20, the main rotor mast 17, the hub jig 21 and the blades 22 of the main rotor on test, providing support and guidance for the transmission 18 and the routing of the forces generated by the components on test to the foundation block 2.

In order to change from the performance test configuration (FIG. 1) to the dynamic test configuration (FIG. 2), it suffices, after dismantling the blades 22 and, if appropriate, the hub jig 21, to remove the height extender 14 with the upper shaft line 20 and the main rotor mast 17, and to mount the main rotor 34 to be tested directly onto the upper plate 12b of the main balance 12.

In FIG. 2, this main rotor 34 has its blades 34a linked to the hub 34b which is integral in rotation with the rotor mast 34c mounted so as to rotate in a casing 34d fixed to the upper plate 12b of the balance 12, the mast 34c being surrounded by a cyclic plate mechanism 34e, with a rotating plate linked to the mast 34c by at least one drive scissors, and with a non-rotating plate held on the casing 34d by a non-rotating scissors, the axial movements and inclinations of the plates, in order to cause the pitch of the blades 34a to vary, being controlled, in a known way, by three hydraulic servocontrols connected to the power hydraulics distributor unit which can be mounted in the frustoconical shroud 4c of the framework 4. The drive to the rotor mast 34c by the lower shaft line 19 linked to the shaft of the motor 1 is provided by a double-spline tubular shaft segment 35, constituting the male part of the spline coupling linking the shaft line 19 to the rotor mast 34c, as already described above.

Hence the main rotor 34 is mounted at a height of 6.5 to 7.5 m above the ground, according to the model of helicopter. Dynamic tests consist in applying to it, in the presence or in the absence of the hydraulic servocontrols mentioned above, a dynamic excitation in a fixed reference system of the rotor mast 34c and of the hub 34b by electric or electrohydraulic servocontrol jacks 36, connected to the hydraulic distributor and/or to the electrical units which may be carried by the shroud 4c, and in also applying a dynamic excitation by undulation of the motor torques supplied by the motor 1, with an amplitude possibly reaching 10% of the torque and a frequency of 6 Hz for example. Thus the movements, accelerations, forces and stresses which various components of the main rotor 34 undergo are measured in a rotating reference system, in order to carry out research and characterization particularly of the vibratory modes. It is also possible to test the response and the reliability of the pitch servocontrols.

Hence, in this dynamic test configuration, a test is carried out on a main rotor 35 as mounted on a helicopter, the rotor 35 on test being installed on the main balance 12 carrying out measurement of the moments and forces and being driven by the motor 1 and the lower shaft line 19 in the direction of rotation opposite to that of the performance tests. Hence the framework 4 now supports only the main rotor 34 on test and the main balance 12, the rotor 34 developing an axial thrust upwards and a flow of air downwards.

In order to change from the dynamic test configuration (FIG. 2) to the endurance test configuration (FIG. 3), the main rotor 34 is removed from the main balance 12, on the upper plate 12b of which a complete propulsion assembly, designated overall as 38, is fixed by means of a mechanical interface or test mechanism plate 37, functionally equivalent to a helicopter transmission support floor. This assembly 38 comprises a main rotor, the blades 38a of which are linked to a hub 38b integral in rotation with a mast 38c driven by a main gearbox linked by a transmission to a powerplant, for example a turbine engine unit, which, with its air intakes, the main gearbox, the suspension of the latter on the mechanical interface 37, and the various equipment items necessary for operating them such as pumps, alternators, rotor brakes, fans, etc, constitutes a subassembly marked 38d, the propulsion assembly 38 also comprising a rear transmission shaft 38e linking the main gearbox to a rear gearbox driving a rear rotor shown diagrammatically as 38f and mounted with the latter at the rear of a tail boom jig 39, specific to the model of helicopter the complete propulsion assembly 38 of which is on test.

This tail boom jig 39 has, at its front end, a structural ring 39a fixed directly by bolting onto the upper flange 4d of the framework 4, in the region of the outer ring of holes 13 (see FIG. 2) surrounding the holes for fixing the lower plate 12a of the balance 12 onto this flange 4d.

The main rotor of the propulsion assembly on test is thus at a height varying from about 7 to 8 m, according to the model of helicopter, and, for this configuration, the test rig also comprises a framework 40 for measuring and for taking up the transverse thrust of the rear rotor 38f.

This framework 40 is a mechanical structure allowing the thrust of the rear rotor 38f to be taken up, and equipped with a sensor allowing this transverse thrust to be measured. This mechanical structure is installed, in endurance test configuration only, on the slab 3 of the test area, in the region of the rear rotor 38f supported with the rear transmission gearbox by the tail boom jig 39. The framework 40 thus provides the support and the positioning of the sensor for measuring the thrust generated by the rear rotor 38f, and the routing of this thrust to its supports and fixing on the slab 3. The structure of this framework 40 allows a maximum thrust of the rear rotor 38f of ±2000 daN (traction or compression) for example, and allows the possibility of longitudinal movement (along the axis of the tail boom jig 39) on the slab 3 over a travel of, for example, 3.5 m, as well as the possibility for vertical movement of, for example, 2 m, of the sensor and of the point of pickup of the transverse thrust of the rear rotor 38f, in order to adapt to the various propulsion assemblies on test, as well as the possibility for symmetric positioning, on either side of the tail boom jig 39, in order to adapt to propulsion assemblies with a rear-rotor 38f mounted to right or to left of the tail boom jig 39.

In order for the transverse thrust of the rear rotor 38f not to generate too great a torque on the main framework 4, via the tail boom jig 39, the latter, in its central part, has a flexible part 39b providing decoupling around a vertical axis.

Figure 4:
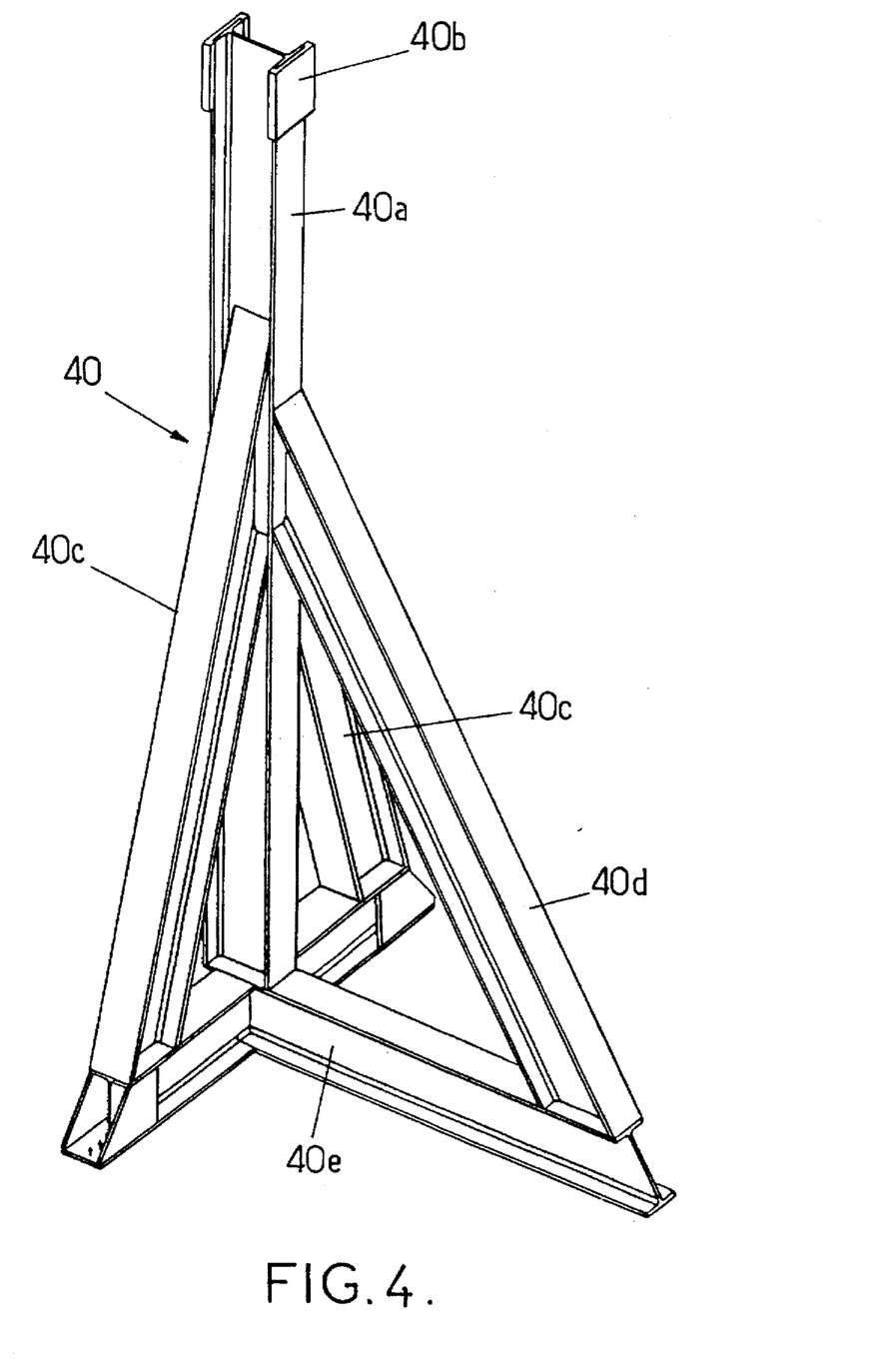
FIG. 4 is a view in perspective of a framework for taking up and measuring the thrust force of the rear rotor, used in the endurance test configuration of FIG. 3.

An example of a framework 40 is represented in FIG. 4: it consists of a central vertical mast 40a made from I-sectional bar, on the upper part of which a mechanism plate 40b slides carrying the sensor for the thrust of the rear rotor 38f, this sensor possibly taking the form of a dynamometric cell consisting, for example, of a unidirectional strain-gauge sensor mounted between two link rods articulated by ball joints, one onto the jig 39 and the other onto the mechanism plate 40b. The central mast 40a is held vertical by three inclined feet, also made of sectional bar, two of which, 40c, form a longitudinal triangulation (parallel to the tail boom jig 39), and the third 40d of which, with the central mast 40a, forms a transverse triangulation, the framework 40 being arranged, with respect to the tail boom jig 39 and the rear rotor 38f, in such a way that the foot 40d is situated on the side towards which the thrust of the rear rotor 38f is directed. The three feet 40c and 40d are supported on a T-shaped base part 40e, also made of sectional bar. This base 40e can be fixed into the slab 3 by anchor rods linking it, in the desired position, to two metal bars, parallel to the longitudinal axis of the tail boom jig 39 and anchored into the slab 3. As a variant, the base part 40e can be equipped with wheels rolling on two rails parallel to each other and to the axis of the tail boom jig 39, the rails being supported by the slab 3, and the framework 40 comprising clamps for immobilizing the base part 40e in the desired position on these rails.

The rear rotor 38f thrust measuring sensor is articulated by a ball joint at each end, and is fixed at one end to the sliding mechanism plate 40b and at the other end to the tail boom jig 39.

In this configuration, a test is carried out on a complete propulsion assembly, as mounted on a helicopter. The rear rotor 38f and the rear gearbox are supported by the tail boom jig 39, which is itself supported by the framework 4, the rest of the propulsion assembly 38 being supported by the main balance 12, by means of the test mechanism plate 37. In this configuration, the motor 1 and the lower shaft line 19 are not used, and the rotors are driven by the turbine engine unit of the propulsion assembly 38. Measurement of the forces is carried out by the main balance 12, for the wrench of the forces induced by the main rotor, and by the force sensor, mounted on the mechanism plate 40b of the auxiliary framework 40, for measuring the thrust force of the rear rotor 38f, with a precision of ±1% of the range of measurement.

It is thus possible to carry out any functional or dynamic characterization test on the propulsion assembly 38 or its components, and to record the piloting parameters, the forces, stresses, deformations, temperatures, and accelerations necessary for that purpose. It is also possible to drive the flight controls of the propulsion assembly 38, for example the non-rotating plate of its cyclic blade pitch control device, by electric jacks, stressing them according to programmed endurance spectra. Equally, control of the turbines can be provided by electric actuators.

For these reasons, the test rig is, as is known, equipped not only with electrical power supply, instrumentation, monitoring control and measurement circuits, but also with hydraulic power generation, with electric generation for control and monitoring of the turbine engine group, with a lubrication unit and with a fuel feed circuit.

All the functions of measurement and of control of the rig on which an item of equipment on test is mounted, comprise the functions of piloting the rotors 21–22, 34, 38a–38b and 38f, also of the power plant units 38d in endurance configuration, assistance with the piloting of the rotors and monitoring the operation of the rig, acquisition, storage and processing of the test measurement, preferably with time-based monitoring of at least certain test parameters, the routing of the measurement and piloting signals between the item of equipment on test and the measurements building, as well as the conditioning and distribution of these signals, which can be carried out in any known way.

We claim:

1. Test rig for rotors of gyrocraft, comprising:

an electric motor with a substantially vertical output shaft, said electric motor being anchored in a foundation block on a substantially horizontal test area and intended to drive blades of a main rotor at least in a performance test configuration, a main mechanical framework with a first shell structure housing said motor, said main framework also being anchored in said foundation block, a transmission comprising at least one lower shaft line provided above said motor and driven in rotation by said motor, said transmission being supported by said main framework while being guided in said main framework in alignment with said output shaft of said motor, a force interface for measurement of moments and forces generated by said blades of said main rotor at least in the performance test configuration, said force interface comprising a main balance supported by said main framework, a framework height extender, including a second shell structure, of upwardly convergent shape, said height extender being mounted on said main balance in the performance test configuration, at least one upper shaft line of said transmission which is supported and guided in said height extender, a coupling means for connecting said upper shaft line in rotation to and in line with said lower shaft line, a main inverse thrust rotor mast equipped with a blade pitch control means for controlling a pitch of said blades, said main inverse thrust rotor mast being mounted on said height extender so as to prolong said upper shaft line while being integral in rotation with said upper shaft line, and having a rotational drive interface, and at least one inverse thrust rotor hub jig connected to said drive interface of said main inverse thrust rotor mast, said inverse thrust rotor hub jig supporting said main rotor blades in an inverted position by presenting an upper surface of said blades towards the ground in such a way that, by driving said blades by said motor in an opposite direction of rotation to a normal direction of rotation of said blades, thrust is exerted downwards on said main inverse thrust rotor mast with an inverse thrust in a test of said blades in the performance test configuration using said blades.

2. Test rig according to claim 1, wherein said main inverse thrust rotor mast is coupled in rotation to said upper shaft line by a drive power measurement interface comprising a torque meter.

3. Test rig according to claim 2, wherein the torque meter is a segment of a tubular shaft mounted integral in rotation about a base of said main inverse thrust rotor mast and having a thinned axial part equipped with strain gauges.

4. Test rig according to claim 1, wherein said main inverse thrust rotor mast is mounted in rotation and supported by a thrust interface for measuring an axial thrust of said main rotor blades during performance testing, said thrust interface comprising a second balance supported by said height extender.

5. Test rig according to claim 4, wherein said second balance comprises two rigid, annular, flat and substantially horizontal plates, one of which is a lower plate fixed to a peak of said height extender and the other of which is an upper plate supporting an inverse thrust mast rotational bearing.

6. Test rig according to claim 1, wherein said blade pitch control means comprises a cyclic-plate mechanism actuated by three electric jacks.

7. Test rig according to claim 1,
wherein said upper and lower shaft lines of said transmission are made integral in rotation with one another by an axial spline coupling provided between two toothed half-couplings each associated with a flector, and wherein said upper and lower shaft lines are made integral in rotation respectively with said main inverse thrust rotor mast and with said output shaft of said motor by respective upper and lower toothed half-couplings.

8. Test rig according to claim 5, wherein said upper and lower shaft lines of said transmission each have a respective upper part guided in rotation and retained by a respective one of two upper part bearings supported respectively by said height extender and said main framework.

9. Test rig according to claim 8, wherein said upper part bearing associated with said upper shaft line is also said inverse thrust and rotational bearing supported by said upper plate of said second balance and in which said main inverse thrust rotor mast is mounted in rotation.

10. Test rig according to claim 8, wherein said main balance comprises two rigid, annular, flat and substantially horizontal plates, one of which is a lower plate fixed to a peak of said main framework, and the other of which is an upper plate supporting said upper part bearing of said lower shaft line on said main framework.

11. Test rig according to claim 1, wherein said main framework and said motor are fixed to a common base part comprising a rigid and annular plate, which said common base part is anchored into said foundation block.

12. Test rig according to claim 1, wherein said first shell structure of said main framework has a rigidity such that said first shell structure exhibits a characteristic frequency greater than about 30 Hz in six degrees of freedom.

13. Test rig according to claim 1, wherein said main framework exhibits a cylindro-conical shape and comprises a cylindrical shroud surrounding said motor and a frusto-conical shroud converging upwards from said cylindrical shroud and forming a casing equipped with a servicing platform above said motor.

14. Test rig according to claim 1,
wherein said motor is reversible, and
wherein said main inverse thrust rotor mast, said upper shaft line of said transmission and said height extender are removable elements used only in the performance test configuration of the main rotor blades,
said inverse-thrust mast being linked in a removable way to said blades by said rotor hub jig,
said upper shaft line being coupled by a removable coupling to said lower shaft line, and
said height extender being fixed by a fixer, which can be dismantled, to said main balance,
such that after removing of said height extender, said main inverse thrust rotor mast and said upper shaft line, said main framework constitutes a support platform for one of (a) a main rotor in a dynamic test configuration which is driven by said motor in the normal direction of rotation, or (b) a propulsion assembly in an endurance test configuration comprising a main rotor and at least one heat engine for driving said main rotor of the propulsion assembly.

15. Test rig according to claim 14, also comprising, in the endurance configuration, a tail boom jig,
(a) a front part of said tail boom jig is fixed by a removable fixer to said main framework, and
(b) a rear part of said tail boom jig supports an anti-torque rotor of the propulsion assembly linked by a transmission shaft to the heat engine of said propulsion assembly which drives said main rotor of the propulsion assembly.

16. Test rig according to claim 15, wherein said front part of said tail boom jig is annular and is fixed removably around said main balance and onto a peak of said main framework.

17. Test rig according to claim 15, wherein said tail boom jig, in a central part thereof, comprises a flexible decoupling part around a substantially vertical axis.

18. Test rig according to claim 15, also comprising an auxiliary mechanical framework bearing on the horizontal test area adjacent said anti-torque rotor and a mechanism plate mounted adjustably in height on said auxiliary framework to support an interface for measuring a transverse thrust of said anti-torque rotor.

* * * * *